April 18, 1961     G. W. JOHNSON     2,979,960
ACCELERATION MEASURING MEANS

Filed June 16, 1958     2 Sheets-Sheet 1

INVENTOR.
George W. Johnson by Ralph R Barnard
ATTORNEY

April 18, 1961    G. W. JOHNSON    2,979,960
ACCELERATION MEASURING MEANS
Filed June 16, 1958    2 Sheets-Sheet 2
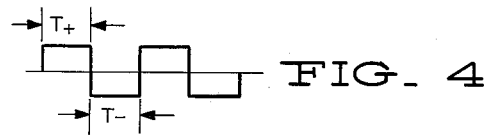
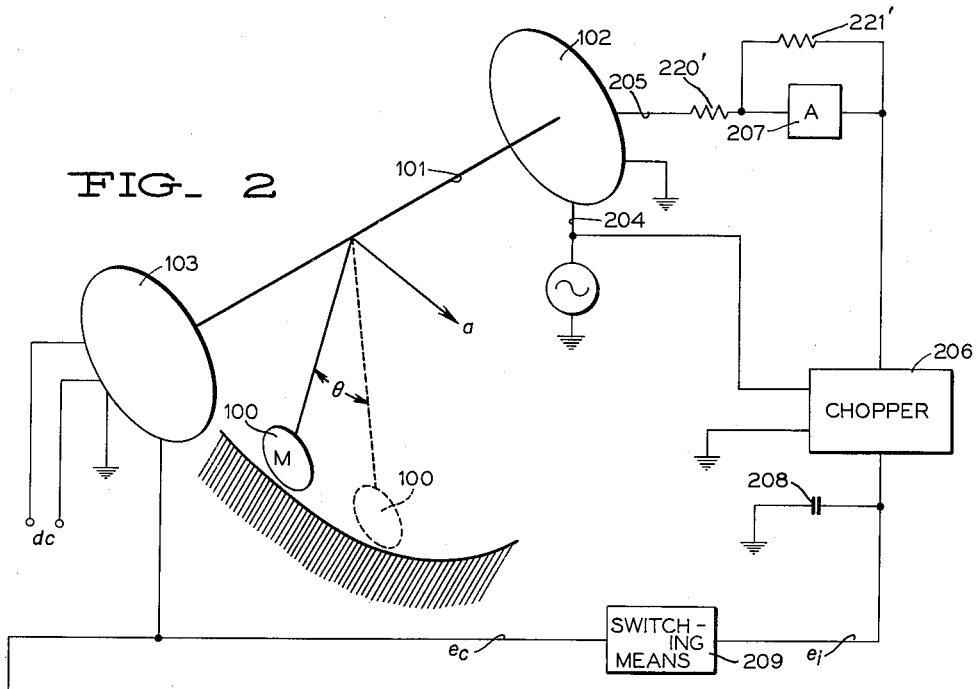
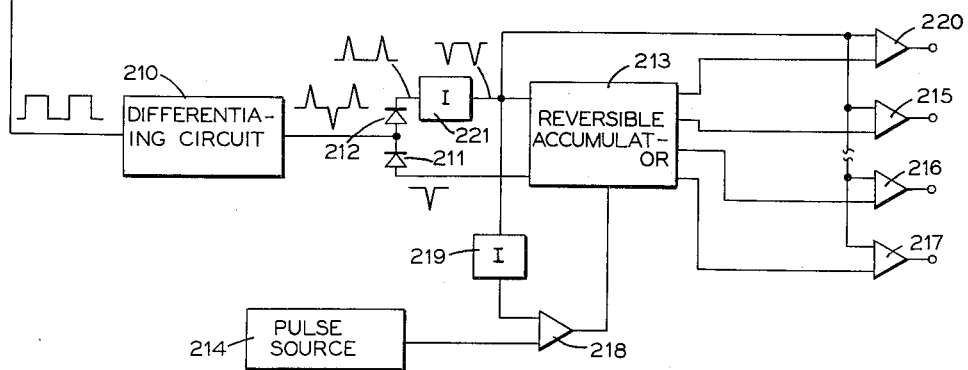

United States Patent Office 2,979,960
Patented Apr. 18, 1961

2,979,960

ACCELERATION MEASURING MEANS

George W. Johnson, Vestal, N.Y., assignor to International Business Machines Corporation, New York, N.Y., a corporation of New York Filed June 16, 1958, Ser. No. 742,256

6 Claims. (Cl. 73—517)

This invention relates to improvements in means for the measurement of linear acceleration and more particularly to a new and improved pendulous accelerometer.

Accelerometers have wide application in the control system arts in the measurement of the linear acceleration of a body in motion. One of the known means for measuring the linear acceleration of a mechanical body or vehicle (such as an aircraft) is a pendulous accelerometer. For reasons which will be elaborated on hereinafter, it is often desirable that pendulous accelerometers used in navigational guidance systems be mounted on attitude stabilized platforms. The pendulous accelerometer conventionally is comprised of a mass suspended by a lever at a determined distance from a shaft rotatable about a pivot axis which is, in turn, an integral part of the mechanical body, the linear acceleration of which is to be measured. If the acceleration to be measured is to be other than gravity, the pivot axis is mounted on a stabilized platform. Moreover, the mass may be immersed in a viscous fluid so as to eliminate non-linear friction known as stiction and substituting viscous damping in its place. Thus, if the mass is subjected to a linear acceleration in a plane which is perpendicular to the earth's gravity vector $g$, the mass will move to make a particular angle with respect to its initial position in accordance with a function of the linear acceleration being measured.

Since the relationship between the angular movement of the mass and the acceleration desired to be measured is non-linear and relatively hard to measure with great accuracy, a technique exists in the prior art for the purpose of avoiding this problem. This technique may be exemplified by connecting a microsyn type generator to the shaft about the pivot axis, referred to above, to be rotated by an angular amount proportional to the angular displacement of the mass, with the output of the generator being amplified to supply a voltage in accordance therewith to a microsyn type torquer device. This torquer device, which is also connected to the shaft, then torques the shaft in a direction opposite to its initial movement under the action of the pendulum so that the pendulum tends to be maintained in its initial neutral position, represented by a zero linear acceleration being measured. The voltage being applied to the torquer to maintain the pendulum in its initial neutral position provides a measure of the linear acceleration (plus any component of gravity along the input axis if the pivot axis is not mounted on a stabilized platform) acting on the pendulum.

Inaccuracies arise from the fact that the microsyn type torquer is not linear in providing an output, and the microsyn type generator has a null uncertainty angle voltage, resulting in significant errors in the system. Moreover, the output voltage provided by such a pendulous accelerometer measuring device is analog in nature, and further conversion equipment is required for this voltage to be utilized in digital type devices.

It is, therefore, a primary object of the present invention to provide a new and improved means for measuring linear acceleration.

It is another object of the present invention to provide a new and improved pendulous accelerometer measuring means.

It is an additional object of the present invention to provide a new and improved pendulous accelerometer measuring means that is less affected by the non-linearity and insensitivity of the pendulous electrical mechanical restoring system.

It is still another object of the present invention to provide a new and improved accelerometer means with a digital readout.

Other objects of the invention will be pointed out in the following description and claims and illustrated in the accompanying drawings, which disclose, by way of examples, the principle of the invention and the best mode which has been contemplated of applying that principle.

In the drawings:

Fig. 2 is a schematic block diagram of an oscillating pendulous accelerometer measuring system in accordance with the present invention;

Fig. 3b shows a plot of an electrical voltage loop helpful in understanding the operation of the electronic contactor of Fig. 3a; and Fig. 4 is a waveform to illustrate the times T+ and T—.

In the description of the drawings, as set forth hereinafter, similar reference numerals refer to similar parts.

Figure 3A:
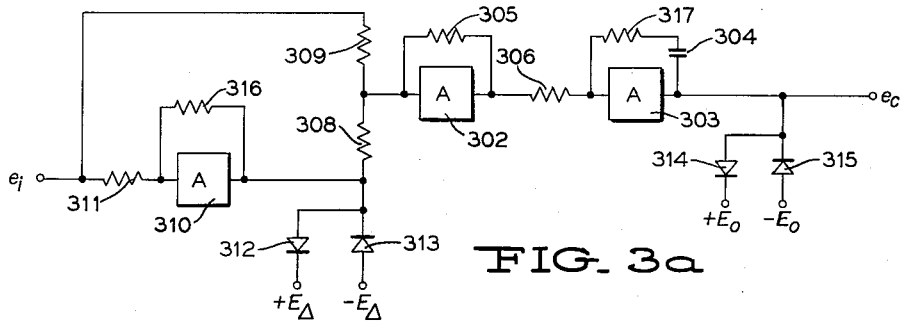
Fig. 3a shows the details of an electronic contactor usable in the measuring system shown in Fig. 2.

Briefly, the present invention relates to a new and improved oscillating pendulous accelerometer for measuring average or constant linear acceleration. Referring to Fig. 2, pendulum 100 having a mass M is affixed to a rotatable shaft 101 which is mounted on a pivot axis so that the angular displacement of the pendulum 100 may be a function of the linear acceleration to be measured. Moreover, a rotatable voltage generating means 102 is connected to shaft 101 to be rotated commensurate with the instantaneous angular displacement $\theta$ of pendulum 100. In addition, an electrical torquer means 103 is also connected to shaft 101 so that it may angularly displace pendulum 100. According to the present invention, further switching means 209 is connected to be responsive to said voltage generating means 102 for energizing said electrical torquing means 103 and applying a known torque to said pendulum 100 between two boundaries of angular displacement $\pm \theta_1$ with the direction of said known torque and angular displacement being reversed at each boundary. Since the average or constant linear acceleration to be measured alters the time required for the pendulum to move between its two boundaries of angular displacement in one direction with respect to the time required for the pendulum to be displaced between its two boundaries in the other direction, a measuring means 206 responsive to this time difference may be utilized to provide an indication of the linear acceleration to be measured.

Figure 1:
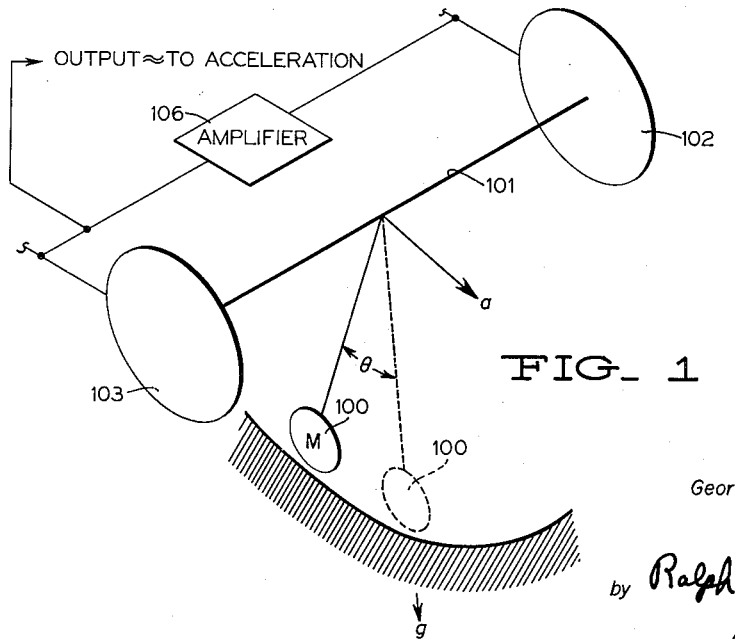
Fig. 1 is a simplified isometric view of a pendulous accelerometer, as known to the prior art, which will be helpful in understanding the present invention.

Referring now to Fig. 1, there is shown an exemplary isometric view of a pendulous accelerometer known to the prior art. Therein is shown a pendulum 100 whose mass is shown at M which is affixed to a shaft 101 oriented about a pivot axis which may be integral with the mechanical body or vehicle (not shown) the acceleration of which is to be measured. Furthermore, if it is desired that the acceleration measured be the linear acceleration of the mechanical body other than the acceleration of gravity, the mechanical body may comprise a stabilized platform such as is often used in inertial guidance systems. The pendulum 100 is shown both in its neutral position in dotted lines representing a zero acceleration and angularly displaced by an angle $\theta$ from its initial position in accordance with a function of the linear acceleration (shown by vector $a$) being measured. Since the relationship between the angular movement of the pendulum 100 and the acceleration which is desired to be measured is non-linear and relatively hard to measure with great accuracy, further means have been utilized by the prior art to minimize the displacement of the pendulum 100 during the measurement. This technique may be exemplified by connecting a rotatable voltage generating means 102 to shaft 101 so that a voltage will be generated which is commensurate in polarity and magnitude (or phase and magnitude) with the direction and magnitude of the angular displacement of pendulum 100. Such a voltage generating means may comprise the well known microsyn type generator or any of the well known equivalents in order to provide either an alternating current or direct current output voltage in accordance with the particular circuit techniques utilized. The output voltage from voltage generating means 102 is then applied through a high gain voltage amplifier 106 to the input of an electrical torquing device 103. Torquer 103 is mechanically connected to shaft 101 and torques the shaft in a direction opposite to its initial displacement $\theta$ under the linear acceleration so that the pendulum 100 tends to be maintained in its neutral position represented by a zero linear acceleration. Provided that the gain of voltage amplifier 106 is maintained at a high level, the voltage applied to the electrical torquer means 103 to maintain the pendulum in its neutral position is a measure of the constant or average linear acceleration acting on the pendulum during the measurement period. The electrical torquer may comprise the well known microsyn type torquer or any of the well known equivalents known to those skilled in the art.

Such a pendulous accelerometer has been satisfactory for many applications requiring the measurement of the constant or average linear acceleration of a mechanical body. However, inaccuracies are present resulting from non-linearities of the pendulous mechanical restoring portions and null detection sensitivity of the voltage generating means. Specifically, the voltage generating means 102 has poor signal resolution in detecting the neutral position of pendulum 100, and the electrical torquer means 103 has a non-linear relationship between the voltage applied and the torque output. As a matter of practice, however, it is the non-linear relationship in the electrical torquing means that gives rise to the largest error in the prior art system described hereinabove.

One of the principal applications of the pendulous accelerometer is to provide linear acceleration measurements in inertia guidance systems for long-range vehicles such as aircraft. In such a system, the accelerometer performs the function of measuring the acceleration of the aircraft along one of its linear degrees of freedom and its output is integrated to provide the velocity of the aircraft along that linear degree of freedom. Furthermore, the quantity commensurate with velocity may be resolved into the earth's axis system according to the instantaneous heading of the aircraft and integrated to provide a measure of the change in position of the aircraft. It will be apparent that any error in the initial measurement of acceleration will be considerably amplified in the double integration providing a quantity commensurate with the change of position. Thus, it is paramount that every effort be made to reduce the error in the initial acceleration measurement.

The present invention takes advantage of the fact that while the relationship between the input voltage and the output torque in the electrical torquing means 103 may be non-linear and the sensitivity of the voltage generating means 102 may be poor when the pendulum 100 is near its neutral position, it is possible to reproduce an operating point on each of these characteristics at two equal and opposite magnitudes of angular displacement $\pm \theta_1$, which may be characterized as boundaries of angular displacement. In addition to the reproducibility of operating points of the electrical torquer 103 and voltage generating means 102, the present invention also relies on the fact that when the pendulous accelerometer is acted upon by an assumed constant or average linear acceleration to be measured, the time required for a known torque to displace the pendulum in one direction between two boundaries of angular displacement $\pm \theta_1$ is related to the time required for an equal known torque to displace the pendulum in the other direction by a function of the magnitude and direction of the constant or average linear acceleration being measured.

Referring now to Fig. 2, the pendulous accelerometer of Fig. 1 is shown in an electrical arrangement so as to operate in accordance with the present invention. Therein, the voltage generating means 102 is shown as a microsyn generator with an input terminal 204 and an output terminal 205. Input terminal 204 functions to energize the microsyn from an alternating current source, while output terminal 205 provides an alternating current voltage output commensurate with the instantaneous angular displacement $\theta$ of shaft 101 from its neutral position. As shown, output terminal 205 is utilized to energize a conventional single pole, double throw chopper 206 through a conventional inverting feedback amplifier 207. Feedback amplifier 207 conventionally utilizes an input resistor 220' and a feedback resistor 221'. The chopper 206 is energized by the alternating current supply voltage, and its output is filtered by a capacitor 208. The filtered output voltage from the chopper 206 is then of a polarity and magnitude commensurate with the direction and magnitude of the angular displacement $\theta$ of pendulum 100 with respect to its neutral or zero position. As indicated hereinabove, conventional voltage generating means 102 may be either of the alternating current or the direct current type. Obviously, if it has a direct current output, the chopper and filtering stage just described would be unnecessary.

In order that the pendulum be forcibly oscillated between two equal and opposite selected boundaries of angular displacement, it is necessary that the output voltage from the chopper 206 be applied to an electronic switch or contractor 209 so as to provide successive reverse energization to the control field of the electrical torquer 103. Electronic switch 209 and torquer 103 cooperate in a manner that the pendulum 100 has a known torque applied thereto while being displaced from one boundary of angular displacement to another and an equal and opposite torque applied thereto while being displaced between the boundaries of angular displacement in the other direction. During this time, the voltage generating means 102 continuously provides a voltage commensurate with the instantaneous displacement of the pendulum to the electronic switch 209.

As indicated hereinabove in reference to the prior art pendulous accelerometer in which the pendulum was torqued back to its initial position during the measurement of linear acceleration, the insensitivity of voltage generating means 102 in detecting when pendulum 100 is in its neutral position and the non-linearity of electrical torquer 103 are limitations on the accuracy of measurement. However, it is possible that the two equal and opposite torque levels in the microsyn torquer corresponding to equal and opposite values of angular displacement $\pm \theta_1$ may be obtained to a high degree of accuracy. An important reason for this is that the sensitivity or resolution limitations of the voltage generating means 102 is not as great at these equal and opposite values of angular displacement $\pm \theta_1$. The electronic contactor 209, which will be described in detail hereinafter in the description of Fig. 3, is intended to continuously monitor the instantaneous angular displacement of the pendulum 100 and provide a fixed voltage output of one polarity as the pendulum moves between two boundaries of angular displacement in one direction and produce an equal fixed voltage of opposite polarity as the pendulum is displaced between its two boundaries of angular displacement in the other direction.

Thus, electrical torquer 103 has an equal fixed voltage applied thereto from the output of electronic switch 209 as the pendulum moves between the two boundaries of angular displacement in one direction and an equal fixed voltage of opposite polarity as the pendulum is displaced between the two boundaries of angular displacement in the other direction. As will be emphasized hereinafter, it is highly desirable that the two boundaries of angular displacement be exactly equal angles $\pm \theta_1$ from the neutral position of the pendulum. As a result of the interaction between voltage generating means 102 and electrical torquer 103 through electrical contactor 209, pendulum 100 will be oscillated back and forth between the two boundaries of angular displacement.

It is this forced oscillation of the pendulum within the closed loop, as set forth above, that provides a novel means for measuring the constant or average linear acceleration acting on the moving body (aircraft). Based on the forced oscillatory action described, the pendulum may be said to be periodic with a zero net change of position and a zero net change of velocity over a cycle of oscillation. Therefore, any forces acting on the pendulum, which are a function of the net change in its angular position or velocity over one period of oscillation, need not be considered. Moreover, because the velocity with which the pendulum moves and the total angle between its two boundaries of angular displacement are small, the relationship between the torque applied to the shaft 101 and its angular rate of displacement may be approximated with a high degree of accuracy. As a result of these considerations, the highly accurate detection and reproducibility of the boundaries of angular displacement and the reproducibility of the torques for successively and reversely displacing the pendulum, the constant linear acceleration acting on the pendulum may be represented by the following equation:

$$N_g = K\left[\frac{(T+)-(T-)}{(T+)+(T-)}\right] + C \quad (1)$$

where $N_g$ = the linear acceleration being measured divided by the acceleration of gravity $g$
$K$ = a scale factor
$T+$ is the time required for the pendulum to move from one boundary to another in a first direction
$T-$ is the time required for the pendulum to move between its boundaries of angular displacement in the opposite direction Constant term C arises due to the inequality which might exist between the two boundaries of angular displacement $+\theta_1$ and $-\theta_1$, or other similar causes.

When either the voltage generating means 102, the electronic contactor 209 or the electrical torquer 103 is modified under calibration conditions with $N_g$ equal to zero such that the time periods T+ and T— are equal, the C term may be dropped and Equation 1 reduced to Equation 2:

$$N_g = K\left[\frac{(T+)-(T-)}{(T+)+(T-)}\right] \quad (2)$$

As indicated in Fig. 4, the output from electronic contactor 209 provides a voltage to electrical torquer 103 which has a rectangular waveform with an average magnitude that is equal with a high order of accuracy to the average magnitude of the plot versus time of the torque required to successively oscillate the pendulum 100 between its boundaries of angular displacement $\pm \theta_1$. Therefore, the average value of this voltage represents an analog voltage commensurate with the linear acceleration being measured. A problem arises, however, in that either conventional voltage averaging measuring means do not have the accuracy required, or the system application of the accelerometer is of the type that the readout must be digital in nature. Therefore, the voltage output from electronic switch 209 is shown in Fig. 2 as having an exemplary digital readout arrangement.

Fig. 4 is a rectangular waveform exemplary of the voltage output from electronic switch 209 relating to the time periods T+ and T— of the waveform. It may be noted that the relationship represented by Equation 2 may be modified to provide a measure of the change of velocity rather than a measure of the linear acceleration, as a matter of choice, by recognizing the well known relationship between these quantities and rearranging Equation 2 as follows:

$$\Delta V = K_g[(T+)+(T-)] = K'[(T+)-(T-)] \quad (3)$$

where K'=a scale factor representing the scale factor K of Equation 2 times the acceleration of gravity $g$.

Referring again to Fig. 2, the rectangular waveform output of electronic contactor 209 is also fed to a differentiating means, shown by block 210, to be differentiated by one of the well known electrical differentiating means (exemplified by an R-C network) to provide a pulse for each positive going and negative going portion of the rectangular voltage waveform input. In order to provide a highly accurate measurement of $(T+)-(T-)$, these positive and negative going pulses are passed through steering diodes 211 and 212 to control the direction of count of a conventional reversible accumulator circuit 213 which is connected to receive negative input pulses at a high frequency by way of negative AND gate 218 from a conventional pulse source 214.

The frequency of pulse source 214 may be selected in accordance with the degree of accuracy in which it is desired to measure the time periods T+ and T—, as defined above. Moreover, Equation 3 may be modified to appear in terms of high frequency pulses as follows:

$$\Delta V = K'[(N+)-(N-)] \quad (4)$$

where

N+ represents the number of pulses transmitted by pulse source 214 to accumulator circuit 213 during the time period following the positive spike input thereto through diode 212 and before the negative going spike input thereto through diode 211.
N— represents the number of pulses transmitted by pulse source 214 to accumulator circuit 213 during the period following the negative spike input thereto through diode 211 and before the succeeding positive spike input thereto through diode 212.

Reversible accumulator 213 may comprise, by way of example, the counter shown in a portion of Fig. 14 on page 31 of the IBM Journal of Research and Development, volume 2, No. 1, January 1958. For example, the output from diode 212 is passed through an inverter 221 and supplied as one of the inputs to the direction trigger shown in said Fig. 14. The other input to the last-mentioned trigger comes from diode 211. Thus, a negative pulse inverter 221 will flip the direction trigger so that the counter or accumulator controlled thereby will count, in one direction, the pulses supplied thereto from gate 218 in Fig. 2. When a negative pulse is supplied to the direction trigger from diode 211, the trigger changes state and the counter will count the input pulses in the opposite direction. The input pulses that are counted are those pulses from gate 218. They are analogous to the "digital input" referenced in said Fig. 14. Other well known reversible counting or accumulating devices may be used to accomplish a similar result. It should be noted that the number of stages (triggers) in the accumulator is determined by the magnitude of the velocity which is being measured. Thus, as a result of operating in the manner as set forth, reversible accumulator 213 will be receiving a repetitive solution of Equation 4 and will be accumulating a number of pulses which is commensurate with the velocity of the body or craft, the linear acceleration of which is being measured.

It should be noted, that for positive acceleration of the body or vehicle, N+ may, by way of example, be greater than N—, while during negative acceleration (deceleration) of the body or vehicle, N— will be greater than N+. Thus, the velocity quantity stored in accumulator 213 will be continuously modified in accordance with changes in that quantity. Since the digital quantity stored in accumulator 213 will be correct only on the completion of a full cycle of output voltage $e_c$, represented by the period between successive negative pulses from inverter 221, it may be seen that the velocity information should be utilized or read out only at the completion of a cycle of the rectangular waveform being analyzed. Therefore, reversible accumulator 213 is shown as being read out "parallel by bit" through an illustrative number of negative AND gates 215, 216, 217 and 220. That is, an output is supplied from each stage of the accumulator to one of the AND gates. The other input to each gate is from the output of inverter 221. The reversible counter 213 may be read out only on the occurrence of a negative pulse from the inverter 221, indicating a completion of one cycle of the rectangular waveform being analyzed.

Further, in order to assure that reversible accumulator 213 is not read out at a time when a pulse from pulse source 214 is altering the count therein, negative AND gate 218 may be placed between the pulse source and accumulator 213, as shown. The negative pulse from inverter 221 results in a positive pulse out of inverter 219 which blocks the negative AND gate 218 for the duration thereof.

As will be obvious to those skilled in the art, numerous changes may be made in the digital counting portions of Fig. 2 in accordance with the quantity (acceleration, velocity, etc.) that is desired to be measured and with regard to the accuracy in the conversion of the rectangular waveform input $e_c$ to digital information. For example, the steering circuit comprising diodes 211 and 212 for separating the positive and negative spikes may be obtained by several other well known techniques. Also, the reversible accumulator 213 might have been of the cold cathode type. Although the read out from reversible accumulator 213 is shown herein as parallel by bit, the well known "serial by bit" type read out could have been utilized. Notwithstanding the fact that the measurement of a quantity commensurate with velocity is provided by Fig. 2, it is obvious that the circuitry could have been modified to provide a quantity commensurate with acceleration by solving an equation similar to Equation 2 instead of Equation 4, as shown. Alternately, the output from reversible accumulator 213 could have been used to energize a digital integrator to provide a quantity commensurate with the change of position of the body in which the accelerometer is mounted in the direction of the velocity being measured.

In order that the technique of the present invention, as set forth hereinabove, provides a desirable degree of accuracy, it is necessary that the boundaries of angular displacement $\pm\theta_1$, be detected accurately and a reproducible fixed voltage of plus and minus polarity be provided to apply a reproducible fixed electrical torque to pendulum 100. The electrical contactor 209, of Fig. 2, performs this function in response to the voltage output $e_i$ from voltage generating means 102, representing the instantaneous angular displacement of pendulum 100, and provides an appropriate plus or minus reproducible fixed voltage $e_c$ as the boundaries are reached.

Figure 3B:
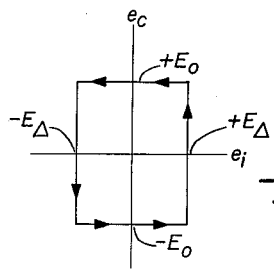

Referring to Fig. 3a, an exemplary electronic contactor is shown that will perform this function. Moreover, Fig. 3b illustrates a plot of the electronic contactor input voltage $e_i$ versus its output voltage $e_c$ (on the abscissa and the ordinate, respectively) in relationship to voltages $+E_A$ and $-E_A$, representing the boundaries of angular displacement $+\theta_1$ and $-\theta_1$, respectively, and voltages $+E_0$ and $-E_0$, representing the reversible reproducible fixed voltages providing the reversible reproducible torques to the pendulum. As shown in Fig. 3a, a regulated voltage supply is used to apply biased voltages commensurate with $+E_A$ to the cathode of diode 312, $-E_A$ to the plate of diode 313, $+E_0$ to the cathode of diode 314, and $-E_0$ to the plate of diode 315. Assuming an initial operating point 1 on the plot of Fig. 3b, as shown, and a typical operating cycle, the pendulum 100 is instantaneously being displaced in a direction such that the voltage input $e_i$ is increasing with a minus polarity. Referring to Fig. 3a, this increasing voltage $e_i$ is being supplied to amplifier 302 via both summing resistors 308 and 309 so as to initially apply equal and opposite inputs thereto.

As shown, resistor 309 is connected to receive input voltage $e_i$ directly, while resistor 308 is connected to receive the input voltage $e_i$ via summing resistor 311 and a polarity reversing feedback amplifier comprising amplifier 310 and feedback resistor 316. The voltages applied to resistors 309 and 308 will remain equal as long as the output from amplifier 310 remains less than $-E_A$, the bias of diode 313. Correspondingly, the voltage output from the feedback amplifier comprising amplifier 302 and feedback resistor 305 remains at zero. During this condition, an electronic integrator comprising summing resistor 306, amplifier 303, feedback resistor 317 and feedback capacitor 304, which is connected to the output of amplifier 302, continues to provide a stored output voltage $e_c$ commensurate with $+E_0$ (the bias of diode 314 representing an initial condition prior to operating point 1).

When input voltage generating means 102 detects that pendulum 100 has reached one of its boundaries of displacement and input voltage $e_i$ becomes more negative than $-E_A$, diode 313 begins to conduct such as to clamp the voltage being applied to summing resistor 308. As a result, the voltage applied to summing resistor 309 becomes larger than that applied to summing resistor 308 for continued increases in negative input voltage $e_i$. Hence, the output of amplifier 302 derives a positive output voltage which causes the capacitor 304 to discharge and recharge its output voltage level from $+E_0$ to $-E_0$. Since diode 315 is biased at $-E_0$, the output from the integrator does not go below that value. Thus, the output voltage $e_c$ of electronic contactor 209, representing a fixed reproducible voltage $E_0$, is reversed in polarity so as to provide an opposite reproducible torque to pendulum 100 in displacing it toward its other boundary.

Meanwhile, the voltage input $e_i$, which is a measure of the instantaneous angular position $\theta$ of the pendulum 100, will vary from $-E_A$ to $+E_A$ with both diodes 312 and 313 biased off and with equal and opposite voltages being applied to summing resistors 309 and 308. As a result, the output from amplifier 302 is zero and the output voltage from the integrator remains constant and equal to $-E_0$. However, when the voltage generating means 102 detects that pendulum 100 has reached its other boundary of angular displacement, represented by an input voltage $e_i$ slightly greater than $+E_A$, the output voltage from amplifier 310 is of a magnitude to cause diode 312 to conduct, thereby clamping the voltage being applied to summing resistor 308 at $-E_A$.

On the occurrence of this condition, the voltages applied to summing resistor 309 and summing resistor 308 are no longer equal and the voltage output from amplifier 302 changes from zero to a negative voltage. As a result, the output voltage of the integrator is rapidly discharged and reversely charged to a voltage of opposite polarity commensurate with $+E_0$ determined by the clamping action of diode 314. The output voltage $e_c$ is then equal to the fixed reproducible voltage $+E_0$, and the electrical torquer 103 of Fig. 2, applies an opposite reproducible torque to pendulum 100 in order that it be displaced toward its other boundary. Meanwhile, the voltage input $e_1$ will vary from $+E_\Delta$ to $-E_\Delta$ with both diodes 312 and 313 biased off and an equal and opposite voltage will be applied to summing resistors 309 and 308. Thus, the electronic contactor of Fig. 3a will pass through operating point 1 and continue to successively apply voltages of $+E_0$ and $-E_0$ as its output voltage $e_c$. As a result, the pendulum 100 is successively torqued between its two boundaries of angular displacement corresponding to $+E_\Delta$ (or $\pm \theta_1$).

While the present invention has been described in connection with providing highly accurate measurements in pendulous accelerometers by superimposing a forced oscillatory arcuate displacement characteristic upon the pendulum with known periodic characteristics which are a function of the linear acceleration acting thereon, such a technique is also applicable to other measuring devices. Gyroscopes are another example of other measuring instruments to which the teachings of the present invention are applicable. It may be noted that the mechanics of the angular readout of a gyro with a single degree of freedom is exceedingly similar to those of a pendulous accelerometer.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An oscillating pendulous accelerometer comprising a rotatable shaft mounted on a pivot axis, a pendulum mounted on said shaft for angular displacement about said pivot axis in accordance with a function of a linear acceleration to be measured, a rotatable voltage generating means connected to said shaft to be rotated commensurate with the angular displacement of said pendulum and responsive to two boundaries of angular displacement, an electrical torquer means connected to angularly displace said pendulum, and switching means responsive to said voltage generating means for successively energizing said electrical torquing means with fixed voltages of opposite polarity for applying a reproducible torque to said pendulum so that it is reversibly displaced, the polarity of said fixed voltage and reproducible torque reversing in direction at each boundary of angular displacement, said average torque being commensurate with a function of the linear acceleration to be measured.

2. An oscillating pendulous accelerometer comprising a rotatable shaft mounted on a pivot axis, a pendulum mounted on said shaft for angular displacement about said pivot axis in accordance with a function of a linear acceleration to be measured, a rotatable voltage generating means connected to said shaft to be rotated commensurate with the angular displacement of said pendulum and responsive to two boundaries of angular displacement, an electrical torquer means connected to angularly displace said pendulum, and switching means responsive to said voltage generating means for successively energizing said electrical torquing means with fixed voltages of opposite polarity for applying a reproducible torque to said pendulum so that it is reversibly displaced, the polarity of said fixed voltage and reproducible torque reversing in direction at each boundary of angular displacement, said average voltage from the output of said switching means being a measure of a function of the linear acceleration to be measured.

3. An oscillating pendulous accelerometer comprising a rotatable shaft mounted on a pivot axis, a pendulum mounted on said shaft for angular displacement about said pivot axis in accordance with a function of a linear acceleration to be measured, a rotatable voltage generating means connected to said shaft to be rotated commensurate with the angular displacement of said pendulum and responsive to two boundaries of angular displacement, an electrical torquer means connected to angularly displace said pendulum, switching means responsive to said voltage generating means for energizing said electrical torquing means for applying a reproducible torque to said pendulum between two boundaries of angular displacement, said direction of reproducible torque and angular displacement being reversed at each boundary, and digital means for measuring the difference in time required for the pendulum to travel between its two boundaries of displacement in one direction and the time required for the pendulum to travel between its two boundaries of displacement in the other direction.

4. An oscillating pendulous accelerometer comprising a rotatable shaft mounted on a pivot axis, a pendulum mounted on said shaft for angular displacement about said pivot axis in accordance with a function of a linear acceleration to be measured, a rotatable voltage generating means connected to said shaft to be rotated commensurate with the angular displacement of said pendulum, an electrical torquer means connected to angularly displace said pendulum, switching means responsive to said voltage generating means for energizing said electrical torquing means for applying a reproducible torque to said pendulum between two boundaries of angular displacement, said direction of reproducible torque being reversed at each boundary, the voltage waveform output of said switching means being rectangular with the width of the positive half cycle being different from the width of the negative half cycle by an amount equal to the linear acceleration to be measured and the difference in time required for the pendulum to travel between its two boundaries of displacement in one direction and the time required for the pendulum to travel between its two boundaries of displacement in the other direction, and digital means responsive to said rectangular voltage waveform for measuring the difference in said widths.

5. An oscillating pendulous accelerometer comprising a rotatable shaft mounted on a pivot axis, a pendulum mounted on said shaft for angular displacement about said pivot axis in accordance with a function of a linear acceleration to be measured, a rotatable voltage generating means connected to said shaft to be rotated commensurate with the angular displacement of said pendulum and responsive to two boundaries of angular displacement, an electrical torquer means connected to angularly displace said pendulum, and switching means responsive to said voltage generating means for successively energizing said electrical torquing means with fixed voltages of opposite polarity for applying a reproducible torque to said pendulum so that it is reversibly displaced, the polarity of said fixed voltage and reproducible torque reversing in direction at each boundary of angular displacement, said average torque being commensurate with a function of the linear acceleration to be measured, means responsive to the rectangular voltage waveform of said generating means for providing a digital electrical output quantity commensurate with the linear acceleration to be measured.

6. An oscillating pendulous accelerometer comprising a rotatable shaft mounted on a pivot axis, a pendulum mounted on said shaft for angular displacement about said pivot axis in accordance with a function of a linear acceleration to be measured, a rotatable voltage generating means connected to said shaft to be rotated commensurate with the angular displacement of said pendulum and responsive to two boundaries of angular displacement, an electrical torquer means connected to angularly displace said pendulum, and switching means responsive to said voltage generating means for successively energizing said electrical torquing means with fixed voltages of opposite polarity for applying a reproducible torque to said pendulum so that it is reversibly displaced, the polarity of said fixed voltage and reproducible torque reversing in direction at each boundary of angular displacement, said average voltage from the output of said switching means being a measure of a function of the linear acceleration to be measured, means responsive to the rectangular voltage waveform of said generating means for providing a digital electrical output quantity commensurate with the linear acceleration to be measured.

References Cited in the file of this patent

UNITED STATES PATENTS

| | | |
|---|---|---|
| 2,049,129 | McNeil | July 28, 1936 |
| 2,819,052 | Dudenhausen | Jan. 7, 1958 |
| 2,846,207 | Marggraf | Aug. 5, 1958 |
| 2,853,287 | Draper et al. | Sept. 23, 1958 |

FOREIGN PATENTS

| | | |
|---|---|---|
| 1,159,895 | France | Feb. 17, 1958 |